United States Patent
Lang et al.

(10) Patent No.: US 6,824,280 B2
(45) Date of Patent: Nov. 30, 2004

(54) FILLABLE AND STIFFENED REARVIEW MIRROR ASSEMBLY

(75) Inventors: Heinrich Lang, Ergersheim (DE); Albrecht Popp, Weihenzell (DE)

(73) Assignee: Lang-Mekra North America, LLC, Ridgeway, SC (US)

(*) Notice: Subject to any disclaimer, the term of this patent is extended or adjusted under 35 U.S.C. 154(b) by 0 days.

(21) Appl. No.: 10/643,214

(22) Filed: Aug. 18, 2003

(65) Prior Publication Data

US 2004/0141243 A1 Jul. 22, 2004

Related U.S. Application Data

(62) Division of application No. 09/652,298, filed on Aug. 29, 2000, now Pat. No. 6,652,107.

(30) Foreign Application Priority Data

May 5, 2000 (DE) .......................................... 100 22 017

(51) Int. Cl.[7] .............................................. G02B 7/182
(52) U.S. Cl. ........................ 359/871; 359/883; 359/900
(58) Field of Search ................................ 359/855, 865, 359/871, 872, 876, 870, 883; 248/476, 479, 481, 483

(56) References Cited

U.S. PATENT DOCUMENTS

| | | |
|---|---|---|
| 2,652,648 A | 9/1953 | Morely |
| 2,783,015 A | 2/1957 | Kampa |
| 3,189,309 A | 6/1965 | Hager |
| 3,291,435 A | 12/1966 | Herr |

(List continued on next page.)

FOREIGN PATENT DOCUMENTS

| | | |
|---|---|---|
| CA | 1095008 | 2/1981 |
| DE | 2537876 | 3/1977 |
| DE | 2703105 | 4/1977 |
| DE | 2820883 | 11/1979 |
| DE | 2660184 | 3/1983 |
| DE | 19530913 | 2/1997 |
| EP | 0590510 | 4/1994 |
| EP | 0761502 B1 | 6/1998 |
| EP | 0865967 | 9/1998 |
| FR | 2633568 | 1/1990 |
| JP | 53142738 | 12/1978 |
| JP | 57033044 | 2/1982 |
| JP | 58185340 | 10/1983 |
| JP | 61160332 | 7/1986 |
| WO | WO0046072 | 8/2000 |

OTHER PUBLICATIONS

English language Abstract of JP 53142738, European Patent Office.
English language Abstract of JP 57033044, European Patent Office.
English language Abstract of JP 58185340, European Patent Office.
English language Abstract of JP 61160332, European Patent Office.
Verified English Translation of EP 0 761 502 B1.

*Primary Examiner*—Mark A. Robinson
*Assistant Examiner*—Alessandro Amari
(74) *Attorney, Agent, or Firm*—McNair Law Firm, P.A.

(57) ABSTRACT

A fillable rearview mirror assembly and method of molding a carrier for the assembly are provided. The mirror assembly has a hollow carrier that can be at least partially filled with a material having a density different than that of the carrier. A mirror can be attached to the carrier and the carrier attached to the vehicle.

12 Claims, 5 Drawing Sheets

U.S. PATENT DOCUMENTS

| | | |
|---|---|---|
| 3,339,876 A | 9/1967 | Kampa |
| 3,346,229 A | 10/1967 | Carson, Jr. |
| 3,371,903 A | 3/1968 | Thompson |
| 3,372,897 A | 3/1968 | Lee |
| 3,375,053 A * | 3/1968 | Ward .................. 359/864 |
| 3,383,152 A | 5/1968 | Ward |
| 3,408,136 A | 10/1968 | Travis |
| 3,448,553 A | 6/1969 | Herr et al. |
| 3,476,464 A | 11/1969 | Clark |
| 3,508,815 A | 4/1970 | Scheitlin et al. |
| 3,522,584 A | 8/1970 | Talbot |
| 3,563,638 A | 2/1971 | Panozzo |
| 3,659,929 A | 5/1972 | Yuzawa |
| 4,174,823 A | 11/1979 | Sutton |
| 4,488,778 A | 12/1984 | Polzer et al. |
| 4,740,068 A | 4/1988 | Fisher |
| 4,747,679 A | 5/1988 | Beach, Jr. |
| 4,883,349 A | 11/1989 | Mittelhauser |
| 4,915,493 A | 4/1990 | Fisher et al. |
| 4,929,074 A | 5/1990 | Urban |
| 4,957,359 A | 9/1990 | Kruse et al. |
| 4,988,178 A | 1/1991 | Eifert |
| 5,107,374 A | 4/1992 | Lupo et al. |
| 5,225,943 A | 7/1993 | Lupo |
| 5,268,795 A | 12/1993 | Usami |
| 5,295,021 A | 3/1994 | Swanson |
| 5,327,294 A | 7/1994 | Koske et al. |
| 5,493,828 A | 2/1996 | Rogowsky et al. |
| 5,576,884 A | 11/1996 | Ise et al. |
| 5,604,644 A | 2/1997 | Lang et al. |
| 5,615,054 A | 3/1997 | Lang et al. |
| 5,621,577 A | 4/1997 | Lang et al. |
| 5,657,174 A | 8/1997 | Boddy |
| 5,721,646 A | 2/1998 | Catlin et al. |
| 5,760,980 A | 6/1998 | Lang |
| 5,786,948 A | 7/1998 | Gold |
| 5,880,895 A | 3/1999 | Lang et al. |
| 6,382,804 B1 | 5/2002 | Lang et al. |
| 6,390,634 B1 | 5/2002 | Lang et al. |

* cited by examiner

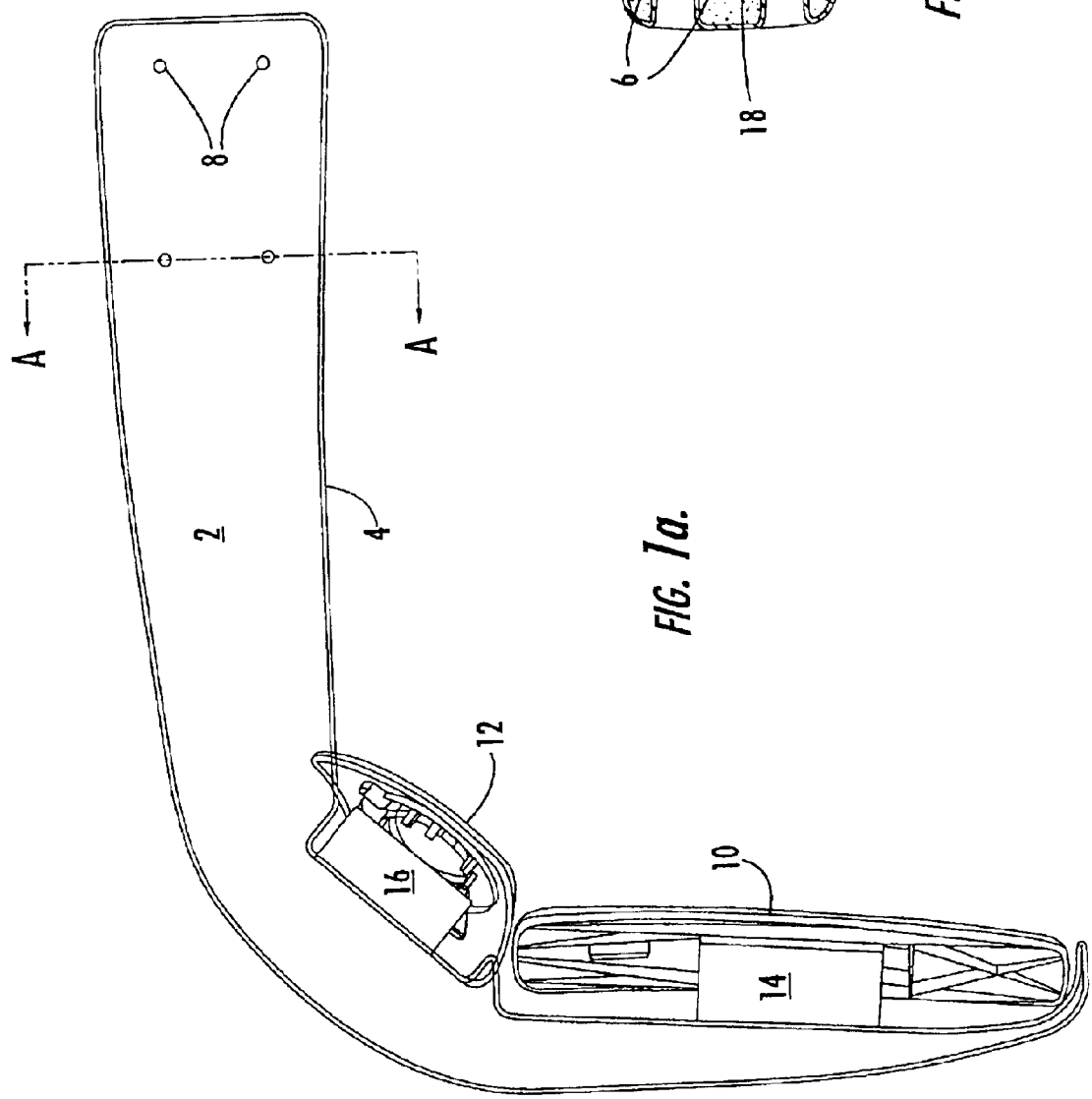

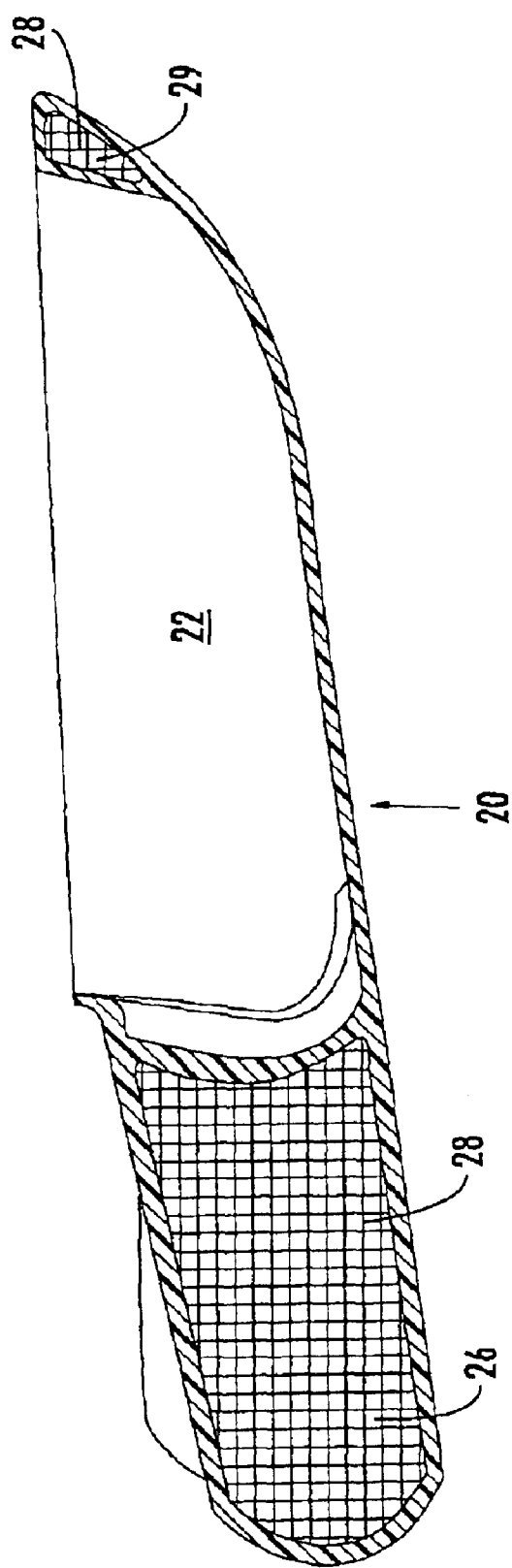

FILLABLE AND STIFFENED REARVIEW MIRROR ASSEMBLY

RELATED APPLICATION

The present application is a divisional application based on co-pending U.S. patent application Ser. No. 09/652,298, filed Aug. 29, 2000 now U.S. Pat. No. 6,652,107, which claims priority under 35 U.S.C. § 119 to German Patent Application No. 10022017, filed May 5, 2000, in the German Patent Office.

BACKGROUND OF THE INVENTION

The invention concerns a rear view mirror arrangement, especially an outside mirror for commercial vehicles.

Outside mirrors of this kind and of variously different construction, are already known in the present state of the technology. A mirror pane is adjustably affixed by a pivoting mechanism to a housing part, which is appropriately connected to the body of the vehicle, allowing the mirror to swing in reference to the housing part. The housing part is, as a rule, a solid plastic part, produced by injection molding. It is generally of a basin-like construction in which further mirror components or corresponding connection points for additions are installed. In particular, for large truck and bus mirrors, the carrying structure for outside mirrors is based on tubing or plates, which are affixed directly to the mirror holder which projects toward the vehicle body. This construction is disclosed by EP-A-0 590 510. The housing part serves then as a covering of the back side of the mirror plate and supports the pivoting mechanism. The housing also provides a streamlined sheathing of the outside mirror. Such construction is extremely expensive and heavy.

A problem with this tube and plate construction is found in that relatively strong vibrations occur in the rearview mirror assembly during the operation of the vehicle. In order to reduce these vibrations, EP 0 865 967 A2 proposes a carrying tube structure, encased in a foamed molded part. Again, the disadvantage of this is that the entire carrying structure is very heavy.

A very light design, which is adaptable to smaller mirrors, is taught by DE 44 29 604 A1. In this case, the tube construction is fully dispensed with and the foam element itself remains as the carrying structure. For this purpose, a gradiated foam is employed as a one-piece element or the carrier comprises several shells.

OBJECTIVES AND SUMMARY OF THE INVENTION

The objective of the present invention is to make available a sufficiently stable rearview mirror, which, in any case, exhibits the least possible tendency to vibrate. This purpose is accomplished by the features of the invention.

Because at least one hollow space in the carrier is filled with a filling material (also called fill material hereafter), which is composed of material other than that of the carrier, or which material possesses a density other than that of the carrier, it is possible to specifically target the vibratory tendencies of the carrier by the appropriate choice of filling material. Additionally the filling material can also lead to an improved stability of the carrier, insofar as the filling material binds itself to the inner wall of the carrier or the interior surface of the hollow space.

A plurality of hollow spaces within the carrier can purposely be provided at specific locations. The choice of the locations is done empirically, wherein the effort is made to bring about the greatest possible damping of the vibration.

The carriers with hollow spaces can be made by injection molding, foam processing such as a thermoplastic, integral foam, or blow molding, including extrusion blow molding. In these methods, for the applicable shape of the hollow spaces, negative shapes are inserted, which are patterned after the desired form.

In accord with an advantageous embodiment of the invention, for additional stabilization, stiffening structures are installed in at least one hollow space. This, in a first instance, can be brought about by inserting a separate component into a hollow space, or, in a second instance, in that the wall structure of the hollow space is provided with reinforcing ribs.

In accord with another advantageous embodiment of the invention, the filling material in the hollow spaces consists of plastic foam, such as polyurethane foam, gradient foam, multi-component hard foam and the like, which binds itself firmly with the interior walls of the hollow spaces, thus increasing the stability of the carrier. Moreover, by means of an appropriate choice of foam density, or by the resilience thereof, the vibratory behavior of the carrier can be so positively affected that during commercial travel, the inevitable vibrations are strongly damped and, as a result, the abrasion therefrom is reduced.

Additionally, or alternatively, it is possible to fill in the hollow space or spaces, or a part thereof, with a viscous material, in particular a gel or a gelatin-like material. In this way, likewise, the vibrations and the damping are specifically influenced.

In accord with a further advantageous embodiment of the invention, a granulate and/or sand may be additionally or alternatively placed in the hollow spaces or in a part thereof. In this way, the fill material can be comprised exclusively of sand or granulate, or a mixture thereof, or yet of a mixture with the above described gel, gelatin or foam. Once again, the stability is favored in a positive way and again the specific vibratory and damping characteristics can be advantageously controlled with attention to specifics.

BRIEF DESCRIPTION OF THE DRAWINGS

Further details, features and advantages of the invention will become evident from the following description of preferred embodiments. The description is made with the aid of the drawing. There is shown in:

FIG. 1*a* a schematic sideview of a first embodiment of the invention with a carrier in the form of a blown plastic, hollow body with a single, continuous hollow space, which is incorporated in foam, FIG. 1*b* a sectional view along the line A—A in FIG. 1*a*, FIG. 2*a* a perspective view of a second embodiment of the invention with a rearview mirror which possesses a carrier with of two integral support arms, FIG. 2*b* a sectional view along the line B—B in FIG. 2*a*, FIG. 3 a schematic sideview of a third embodiment of the invention with a carrier in the form of a plastic, hollow body with a plurality of hollow spaces, and FIG. 4 a partial sectional view of a fourth embodiment of the invention with a carrier constructed of a blown plastic, hollow body with additional stiffening structural members.

DESCRIPTION OF THE PREFERRED EMBODIMENT

Figure 2A:
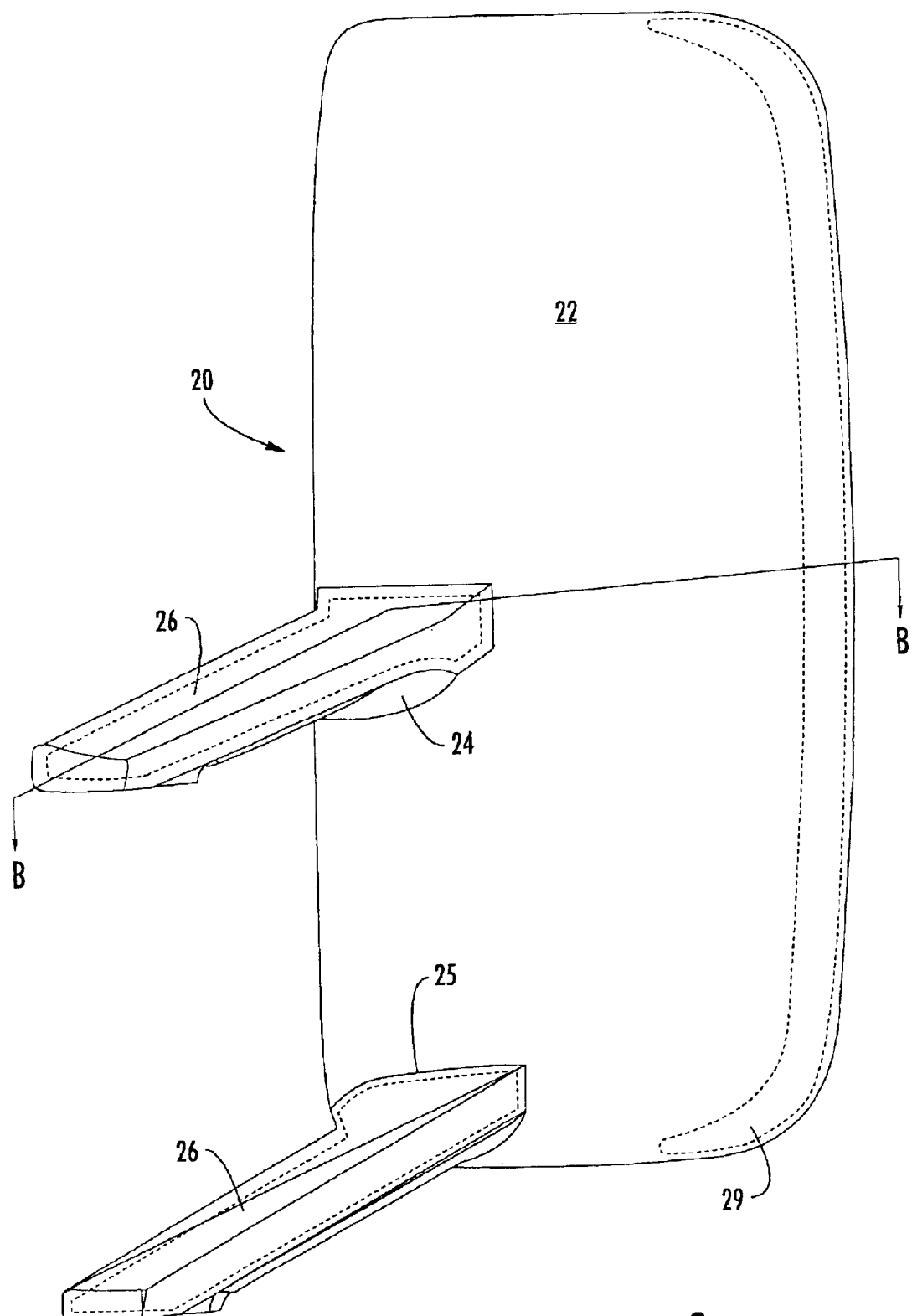

Reference will now be made in detail to the presently preferred embodiment of the present invention, an example of which is illustrated in the drawings. The example is provided by way of explanation of the invention and is not meant as a limitation of the invention. For example, features illustrated or described as part of one embodiment can be used on another embodiment to yield yet a third embodiment. Accordingly, it is intended that the present invention include such modifications and variations.

The FIGS. 1a and 1b show, in a schematic manner, a first embodiment of the invention. The rearview mirror incorporates a carrier 2 in the form of a plastic hollow body 2, which was blow formed from an extruded plastic blank. The carrier 2 possesses a closed wall 4, which envelopes a hollow space 6. On the vehicle end of the plastic hollow body 2 are provided holes for screws 8. These fastening means bind the rearview mirror arrangement to the body of the vehicle. On the end of the plastic hollow body 2 remote from the said body, in respective recesses are mounted a first mirror 10 and a second mirror 12. Both mirrors include, respectively, an adjustment mechanism 14, 16, by means of which the corresponding mirror is mounted on the plastic hollow body 2. The wall 4 of the plastic hollow body 2 is made thicker at positions of greater stress than is the corresponding thickness at positions of less stress (not shown). As is indicated in FIG. 1b by means of dotted areas, the entire hollow space 6 is foam filled with a foam material 18, this being, for instance, a polyurethane foam, a gradient foam, or the like.

The FIGS. 2a and 2b show a second embodiment of the invention with a carrier 20, which has a shell-like mirror housing 22 and parallel upper/lower support arms 24, 25 extending away from said mirror housing 22. The two support arms 24, 25 are hollow and possess respectively a hollow space 26, which is filled with filling material 28. The carrier 20 incorporates on the end of the mirror housing 22 remote from the vehicle, a third hollow space 29, which extends itself longitudinally along the rim of the mirror housing 22, this hollow space being likewise packed with foamed fill material 28.

For the filling material 28, preferably polyurethane foam, gradient foam, multi-component hard foam or the like can be employed. By the insertion of the foam into the follow spaces 26 and 29, first, the stability is improved, since the foam in the hollow spaces 26 and 29 binds to the inner walls, i.e. adheres thereto.

Second, by means of said insertion of foam, the vibration behavior is positively influenced, that is, the vibrations are damped.

Figure 3:
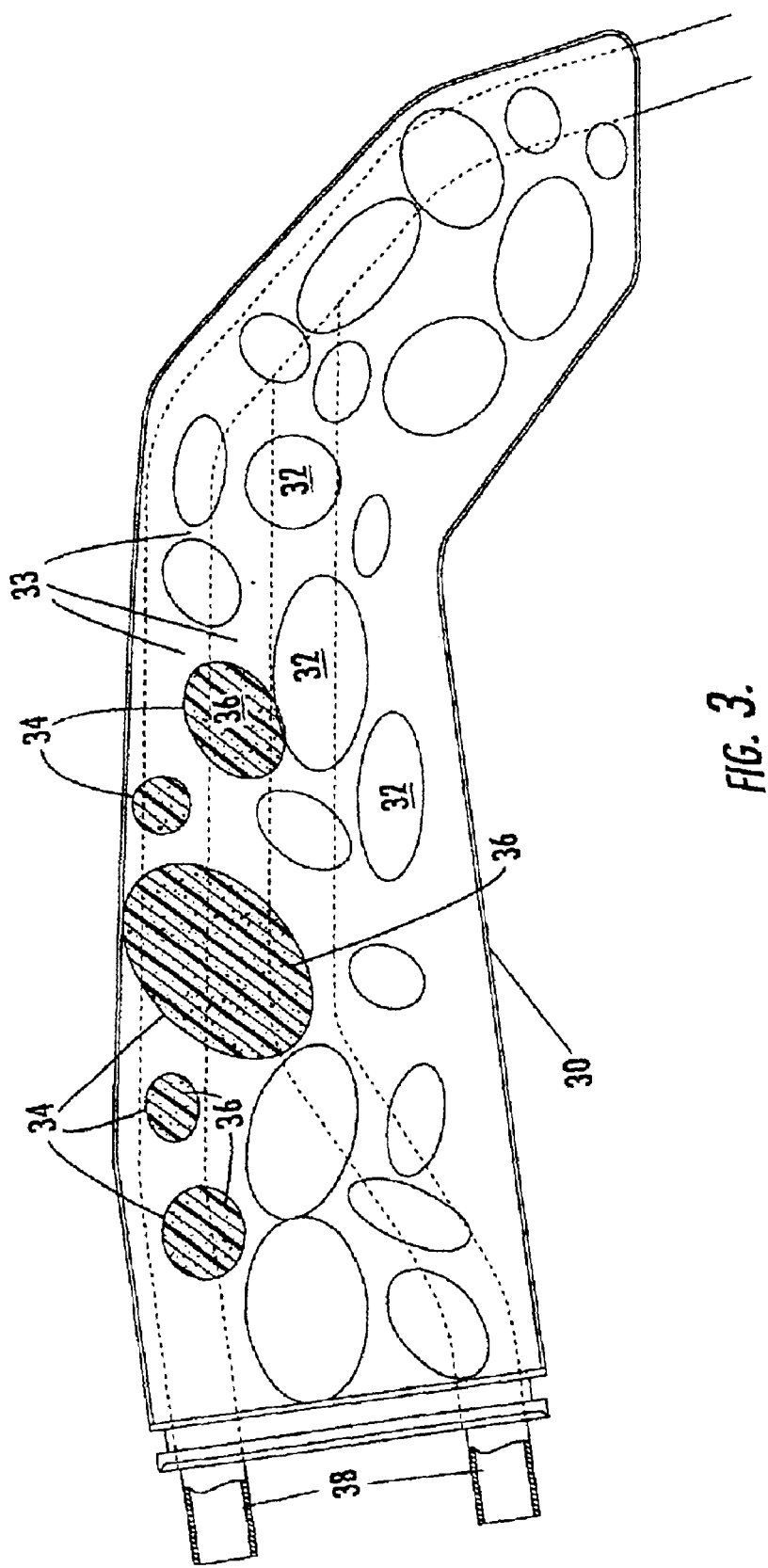

FIG. 3 illustrates a third embodiment of the invention, showing a foam carrier 30, which incorporates a plurality of bubble shaped hollow spaces 32 and 34. In this case, the bubble shaped hollow spaces 32 are empty, while the bubble shaped hollow spaces 34 are filled with a filling material 36. Because of the plurality of the hollow spaces 32, 34, first, the weight is reduced and second, by means of the dividing walls 33 between the hollow spaces 32, 34, the stability is increased. By means of the filling of a portion of the hollow spaces, namely the hollow space 34 with a filling material 36, the vibratory properties of the mirror assembly are influenced in such a way, that less vibration occurs. That is, the vibrations are damped. Additionally, in the case of the third embodiment, carrier arms 38 of metal are provided, by means of which the stability of the carrier 30 is additionally increased.

Figure 4:
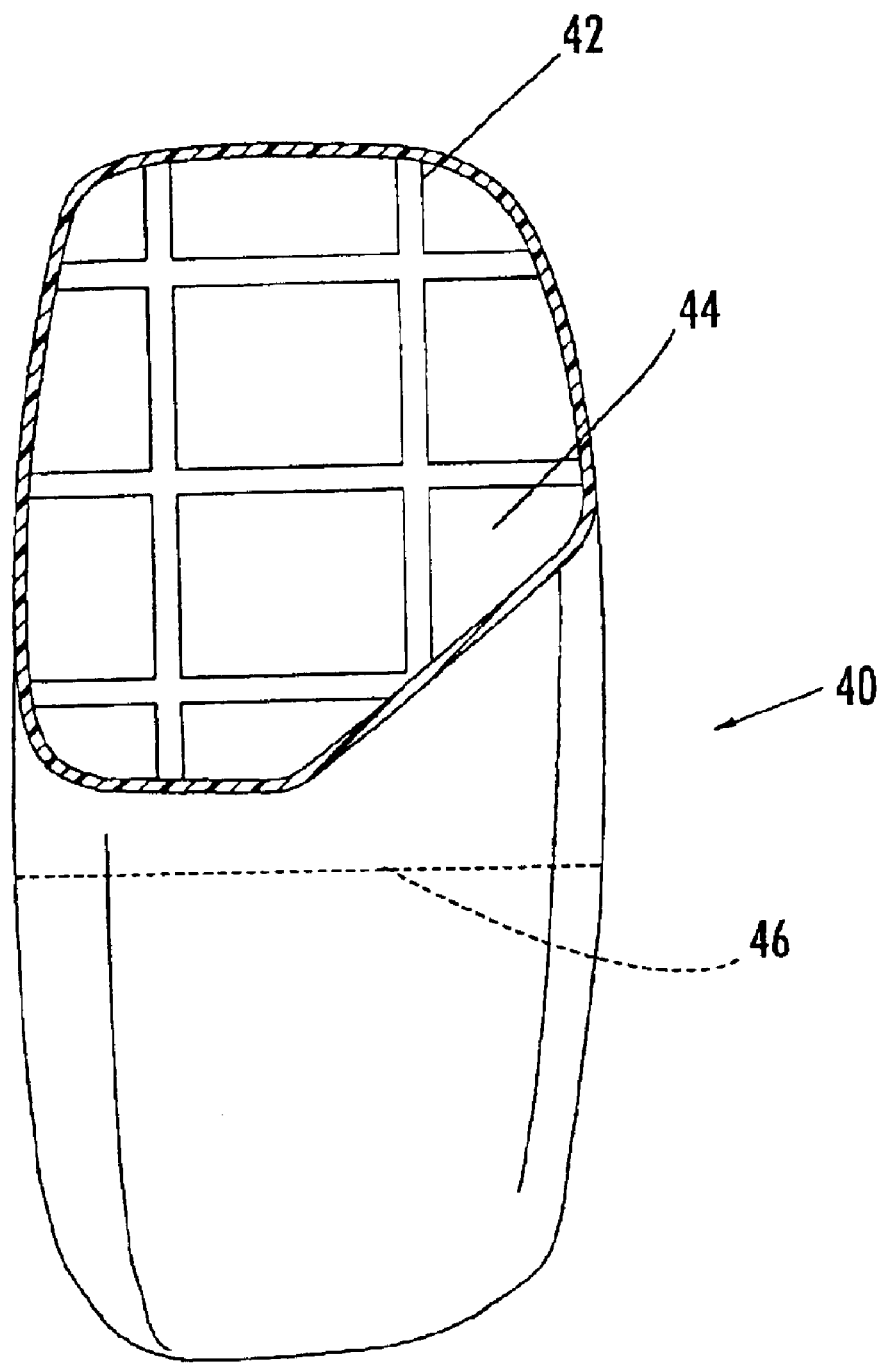

FIG. 4 shows a fourth embodiment of the invention, with a carrier 40 in the form of a hollow plastic body, in which grid-type stiffening ribs 42 have been provided. The hollow plastic body 40 encapsulates a continuous hollow space 44, which is partially filled with a gel 46 as a filling material. The partial filling of the hollow space 44 with gel 46 is illustrated by a dotted line. The grid shaped stiffening ribs 42 are made by fashioning corresponding wall thicknesses in the original plastic blanks before the blowing of these blanks in the blow-mold. By means of the grid-like stiffening ribs 42, the stability is increased. Because of the gel 46 and the degree of the filling thereof in the hollow space 44, the damping behavior can be specifically influenced.

It will be apparent to those skilled in the art that various modifications and variations can be made in the present invention without departing from the scope and spirit of the invention. It is intended that the present invention include such modifications and variations as come within the scope of the appended claims and their equivalents.

What is claimed is:

1. A method of manufacturing a rearview mirror assembly for a vehicle, the method comprising the steps of:

providing a plastic carrier having a first hollow space therein, the first hollow space extending substantially through the majority of the carrier, the carrier having a first and a second side;

attaching a mirror housing to the first side of the carrier;

affixing a carrier arm having a proximal end and a distal end to the vehicle, the proximal end affixed to the second side of the carrier opposite the mirror housing, the distal end extending away from the proximal end and configured to attach the carrier to the vehicle, the arm having a second hollow space therein;

affixing a mirror element to the mirror housing; and filling the first hollow space of the carrier and the second hollow space of the carrier arm with a fill material.

2. The method as in claim 1, further comprising the step of inserting a dividing wall and a hollow bubble in at least one of the first and second hollow spaces.

3. The method as in claim 2, wherein the hollow bubble is filled with the fill material.

4. The method as in claim 1, further comprising the step of placing a second carrier arm substantially parallel to the carrier arm affixed to the vehicle.

5. The method as in claim 1, further comprising the step of affixing a stiffening structure to the carrier within the first hollow space of the carrier.

6. The method as in claim 5, wherein the stiffening structure is one of grid-like ribs, tubes, and combinations thereof.

7. The method as in claim 5, wherein the grid-like ribs or tubes intersect each other to form a cage-like structure, the first hollow space disposed apart from the carrying arm.

8. The method as in claim 1, further comprising the step of forming one of the first and second spaces to have a plurality of hollow bubbles suspended in a portion of the hollow space and stabilized carrier.

9. The method of claim 1 further including forming said plastic carrier by:

providing a blank to be melted;

heating the blank to form a molten blank;

forcing air into the molten blank to form said plastic carrier as a blowmolded carrier having said hollow space therein;

inserting a stiffening structure in the blowmolded plastic carrier;

cooling the blowmolded plastic carrier to achieve form stability; and inserting a foam element in the hollow space.

10. The method as in claim 9, further comprising the step of providing the blank with varying thicknesses to achieve varying thicknesses in the plastic carrier.

11. The method as in claim 9, including providing the stiffening structure be one of grid-like ribs, tubes, and/or combinations thereof.

12. The method as in claim 9, including shaping the foam element to be complementary to the stiffening structure, the hollow space, and combinations thereof.

* * * * *